June 21, 1949.  E. F. STEINERT ET AL  2,473,917
ALTERNATING CURRENT ARC WELDING SYSTEM
Filed Feb. 13, 1948
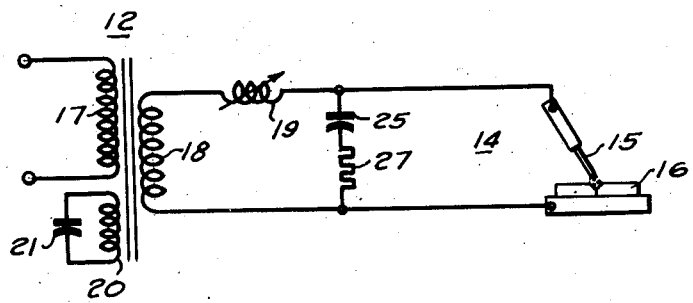
WITNESSES:
INVENTORS
Emil F. Steinert and
Charles H. Jennings.
BY
ATTORNEY Patented June 21, 1949

2,473,917

UNITED STATES PATENT OFFICE 2,473,917

ALTERNATING CURRENT ARC WELDING SYSTEM

Emil F. Steinert, Williamsville, and Charles H. Jennings, Buffalo, N. Y., assignors to Westinghouse Electric Corporation, East Pittsburgh, Pa., a corporation of Pennsylvania Application February 13, 1948, Serial No. 8,254

6 Claims. (Cl. 315—246)

1

Our invention relates, generally, to arc welding systems, and it has reference in particular to an alternating current arc welding system of the stabilized type.

Generally stated, it is an object of our invention to provide an improved stabilized arc welding system, which is simple and inexpensive to manufacture, and which is reliable and effective in operation.

More specifically, it is an object of our invention to provide for substantially eliminating undesirable arc noises in a stabilized alternating current arc welding system.

It is also an object of our invention to provide, in an alternating current arc welding system embodying a shunt stabilizing capacitor, for utilizing a relatively low value of resistance in series circuit relation with the capacitor for reducing the arc noise without appreciably affecting the stability of the arc.

Another object of our invention is to provide for connecting a resistor of approximately one ohm or less in circuit relation with an arc stabilizing capacitor in an alternating current arc welding system.

Yet another object of our invention is to provide for reducing the amplitude of some of the higher harmonics of the transient arc current in a stabilized arc welding system, and thus lower the noise level of the arc.

Other objects will in part be obvious, and will in part be described hereinafter.

In practicing our invention in one of its forms, a capacitor of about 120 microfarads is connected across the secondary winding of the welding transformer in an alternating current arc welding system, intermediate the usual current limiting reactor and the arc. A resistor on the order of from $\frac{1}{10}$ to 1 ohm is connected in series circuit relation with capacitor to reduce the arc noise without appreciably reducing the effectiveness of the arc stabilizing capacitor.

For a more complete understanding of the nature and scope of our invention, reference may be made to the following detailed description, which may be read in connection with the accompanying drawing, in which the single figure is a diagrammatic view of an alternating current arc welding system embodying the invention in one of its forms.

Referring to the drawing, there is shown an alternating current arc welding system wherein a welding transformer 12 is disposed to supply electrical energy to a welding circuit 14, including an electrode 15 and work 16 upon which a welding operation is to be performed.

The transformer 12 may be of any suitable type having a primary winding 17 for connection to a suitable source of alternating current power, and a secondary winding 18. The secondary winding may be connected to supply electrical energy to the welding circuit 14 at an open circuit voltage on the order of approximately 65 volts. A current limiting reactor 19 may be connected in the welding circuit 14 in series circuit relation with the secondary winding 18 and be adjustable to provide for limiting the welding current to different predetermined suitable values. In order to improve the power factor of the welding system and raise it to a satisfactory value, the transformer 12 may be provided with a tertiary winding 20 across which may be connected a capacitor 21. When used with a 300 ampere welder having a 440 volt tertiary winding, the capacitor 21 may have a value on the order of 80 microfarads, for example.

In order to provide for maintaining a reasonably stable arc between the electrode 15 and the work 16, an arc stabilizing capacitor 25 may be connected across the welding circuit in shunt circuit relation with the arc welding circuit, intermediate the reactor 19 and the arc, as shown. The capacitor 25 may have a value of from approximately 50 to 150 microfarads, being, for example, on the order of 120 microfarads, as disclosed in the copending application of Alfred B. White, Serial No. 713,237, filed on November 30, 1946.

When an arc stabilizing capacitor is connected across the welding circuit in this manner it induces transient voltages of relatively high frequency across the arc during the intervals when the arc current is passing through its zero value and thereby assists in keeping the arc space ionized so as to provide a more stable arc. It has been found, however, that the presence of such an arc stabilizing capacitor greatly increases the noise level of the arc. This increase in noise level is generally characterized by a relatively sharp, crackling sound, which has proven to be objectionable to welding operators even though the stabilized arc may not actually be harmful to them. By connecting a resistor 27 in series circuit relation with the arc stabilizing capacitor 25, the amount of the arc noise produced by the capacitor may be greatly reduced. For example, a resistor having a value of from $\frac{1}{10}$ of one ohm to approximately one ohm has been found to be highly effective in reducing the characteristic noise of a stabilized arc to a very low and entirely unobjectionable level. The effect of such a resistor has been checked over the entire welding current range of from 20% to 125% of the current rating of the welding transformer and has been found to give substantially uniform results over the entire operating range. It is believed that the resistor reduces the peak values of transient current produced by the arc stabilizing capacitor, thereby tending to smooth out the transient current wave and reduce or even eliminate some of the higher harmonics present therein. The reduction of these higher harmonics reduces the audible noises of the arc, without appreciably affecting the magnitude of the transient current, and hence the arc stabilizing effect of the capacitor 25.

From the above description and accompanying drawing, it will be apparent that we have provided in a simple and effective manner for improving the operating characteristics of a stabilized alternating current arc welding system. By reducing the level of the heretofore objectionable arc noise, stabilized arc welders are made more attractive to the operator who is enabled to perform more efficiently when using such stabilized arc welding systems. Since the noise level of the arc is reduced without appreciably affecting the stability of the arc, the effectiveness of the arc stabilizing capacitor for all practical purposes is in no way reduced.

Since certain changes may be made in the above-described constructions, and different embodiments of the invention may be made without departing from the spirit or scope of the invention, it is intended that all the matter contained in the above description and shown in the accompanying drawing shall be considered as illustrative and not in a limiting sense.

We claim as our invention:

1. An arc welding system comprising, a welding transformer disposed to supply welding current to a welding circuit, a capacitor connected in shunt circuit relation with the welding circuit intermediate the transformer and the arc, and a resistor connected in series circuit relation with the capacitor to reduce the arc noise without appreciably reducing the stabilizing effect of the capacitor.

2. For use with an alternating current arc welding circuit disposed to be energized from a welding transformer for maintaining an electric arc, a capacitor of from 55 to 125 microfarads connected in shunt circuit relation with the arc, and a resistance of about one ohm connected in series circuit relation with the capacitor.

3. In an arc welding system, a transformer having a primary winding disposed to be connected to a source of electrical energy, said transformer having a secondary winding and a tertiary winding, a capacitor connected across the tertiary winding to improve the power factor of the system, an arc stabilizing capacitor connected in shunt circuit relation with the secondary winding to provide a transient arc stabilizing current, and a resistance element connected in series circuit relation with the stabilizing capacitor to reduce the higher harmonics of the transient stabilizing current.

4. The combination with a transformer having a primary winding for connection to a source of alternating current, a secondary winding disposed to have an open circuit voltage on the order of 65 volts disposed to supply electrical energy to an arc and a tertiary winding, of a capacitor connected across the tertiary winding to correct the primary power factor, an arc stabilizing capacitor of approximately 120 microfarads connected in shunt circuit relation with the arc to produce a transient arc current, and a resistor of about one ohm resistance connected in series circuit relation with the arc stabilizing capacitor to reduce harmonics of the transient arc current in the audible range.

5. For use with a transformer disposed to supply alternating current to an arc welding circuit, an arc stabilizing capacitor connected in shunt circuit relation with the arc, and a resistance element connected in series circuit relation with the capacitor to substantially reduce the arc noise without materially reducing the stabilizing effects of the capacitor.

6. An arc welding system comprising, a transformer disposed to supply electrical energy to a welding circuit, a reactor connected in series circuit relation with the transformer and the welding circuit, an arc stabilizing capacitor of approximately 120 microfarads connected in shunt relation with the welding circuit intermediate the reactor and the arc, and a resistor of less than one ohm connected in series circuit relation with the capacitor to minimize the arc noise.

EMIL F. STEINERT.
CHARLES H. JENNINGS.

REFERENCES CITED

The following references are of record in the file of this patent:

UNITED STATES PATENTS

| Number | Name | Date |
|---|---|---|
| 965,168 | Eastham | July 26, 1910 |
| 1,709,629 | Peters | Apr. 16, 1929 |
| 1,979,944 | Kost | Nov. 6, 1934 |
| 2,097,327 | Hunter | Oct. 26, 1937 |